(12) United States Patent
Abustan, Jr. et al.

(10) Patent No.: US 7,821,741 B2
(45) Date of Patent: Oct. 26, 2010

(54) DISK DRIVE HEAD STACK ASSEMBLY INTERACTING WITH MOVEMENT GUIDE FOR PREVENTING HEAD FROM CONTACTING THE DISK DURING READ/WRITE OPERATIONS

(75) Inventors: Alfredo Z. Abustan, Jr., Quezon (PH); Mark Valen L. Aganon, Quezon (PH)

(73) Assignee: Hitachi Global Storage Technologies Netherlands, B.V., Amsterdam (NL)

( * ) Notice: Subject to any disclaimer, the term of this patent is extended or adjusted under 35 U.S.C. 154(b) by 677 days.

(21) Appl. No.: 11/646,814

(22) Filed: Dec. 27, 2006

(65) Prior Publication Data

US 2008/0158714 A1 Jul. 3, 2008

(51) Int. Cl.
G11B 5/55 (2006.01)

(52) U.S. Cl. ............... 360/264.1; 360/245.7; 360/254.7

(58) Field of Classification Search ... 360/254.2–255.9, 360/245.7, 264.1
See application file for complete search history.

(56) References Cited

U.S. PATENT DOCUMENTS

| | | | |
|---|---|---|---|
| 5,068,841 A * | 11/1991 | Nakayama et al. | ......... 369/13.2 |
| 5,777,815 A | 7/1998 | Kasiraj et al. | |
| 6,078,468 A * | 6/2000 | Fiske | ...................... 360/97.01 |
| 6,172,853 B1 * | 1/2001 | Davis et al. | ............... 360/245.7 |
| 6,181,520 B1 | 1/2001 | Fukuda | |
| 6,535,355 B2 * | 3/2003 | Boutaghou et al. | ....... 360/245.7 |
| 6,801,400 B2 * | 10/2004 | Fu et al. | ................... 360/245.7 |
| 2005/0088773 A1 | 4/2005 | Yoshida | |
| 2006/0012912 A1 | 1/2006 | Jeong | |
| 2006/0072236 A1 | 4/2006 | Ito et al. | |
| 2006/0082920 A1 | 4/2006 | Horiuchi et al. | |

FOREIGN PATENT DOCUMENTS

| | | |
|---|---|---|
| JP | 06275002 | 9/1994 |
| JP | 2003173639 | 6/2003 |
| JP | 2005267716 | 9/2005 |

OTHER PUBLICATIONS

Hamilton, H., et al., "Contact Perpendicular Recording on Rigid Media", *IEEE Transactions on Magnetics*, vol. 27, No. 6, (Nov. 1991),4921-4926.
Lee, Sung-Chang, et al., "Strategies to Avoid Head-Disk Instabilities Due to Adhesion in Ultralow Flying Head-Disk Interfaces", *IEEE Transactions on Magnetics*, vol. 40, No. 4, (Jul. 2004),3130-3135.
Liu, Bo, et al., "Study of Clock Head/Disk Interface Failure Mechanism in Servo-Writing Process", *IEEE Transactions on Magnetics*, vol. 34, No. 4, (Jul. 1998),1723-2699.
Uy, James C., "Head/Disk Interface Failure Mechanism", *IEEE Transactions on Magnetics*, vol. 26, No. 5, (Sep. 1990),2697-2699.
Zeng, Q. H. , et al., "Two Calibration Mehods of AE Measurement Channels for Slider-Disk Contact Detection", *IEEE Transactions on Magnetics*, vol. 35, No. 5, (Sep. 1999),2367-2369.

* cited by examiner

*Primary Examiner*—A. J. Heinz

(57) ABSTRACT

One embodiment in accordance with the invention is an apparatus comprising a movement guide that can be utilized with a data storage device. The movement guide can be for preventing a magnetic head of the data storage device from contacting a disk of the data storage device during operation.

20 Claims, 10 Drawing Sheets

DISK DRIVE HEAD STACK ASSEMBLY INTERACTING WITH MOVEMENT GUIDE FOR PREVENTING HEAD FROM CONTACTING THE DISK DURING READ/WRITE OPERATIONS

BACKGROUND

Hard disk drives are used in almost all computer system operations. In fact, most computing systems are not operational without some type of hard disk drive (HDD) to store the most basic computing information such as the boot operation, the operating system, the applications, and the like. In general, the hard disk drive is a device which may or may not be removable, but without which the computing system will generally not operate.

The basic hard disk drive model includes a storage disk or hard disk that spins at a designed rotational speed. An actuator arm is utilized to reach out over the disk. The arm carries a head assembly that has a magnetic read/write transducer or head for reading/writing information to or from a location on the disk. The transducer is attached to a slider, such as an air-bearing slider, which is supported adjacent to the data surface of the disk by a cushion of air generated by the rotating disk. The transducer can also be attached to a contact-recording type slider. In either case, the slider is connected to the actuator arm by means of a suspension. The complete head assembly, e.g., the suspension and head, is called a head gimbal assembly (HGA).

In operation, the hard disk is rotated at a set speed via a spindle motor assembly having a central drive hub. Additionally, there are tracks evenly spaced at known intervals across the disk. When a request for a read of a specific portion or track is received, the hard disk aligns the head, via the arm, over the specific track location and the head reads the information from the disk. In the same manner, when a request for a write of a specific portion or track is received, the hard disk aligns the head, via the arm, over the specific track location and the head writes the information to the disk.

Over the years, the disk and the head have undergone great reductions in their size. Much of the refinement has been driven by consumer demand for smaller and more portable hard drives such as those used in personal digital assistants (PDAs), MP3 players, and the like. For example, the original hard disk drive had a disk diameter of 24 inches. Modern hard disk drives are much smaller and include disk diameters of less than 2.5 inches (micro drives are significantly smaller than that). Advances in magnetic recording are also primary reasons for the reduction in size.

This continual reduction in size has placed steadily increasing demands on the technology used in the HGA, particularly in terms of power consumption, shock performance, and disk real estate utilization. One recent advance in technology has been the development of the Femto slider, which is roughly one-third of the size and mass of the older Pico slider, which it replaces; over the past 23 years, slider size has been reduced by a factor of five, and mass by a factor of nearly 100.

One type of problem associated with hard disk drive technology is known as head crash, which is a phenomenon wherein a read/write head of a hard disk drive touches a rotating disk (or platter). Often when this occurs, the read/write head cannot return to its ramp and remains on top of the disk, commonly referred to as head on disk. It is pointed out that the damage to the hard disk drive caused by head crash can range from a loss of some data to complete inoperability of the hard disk drive. One of the causes of head crash is severe shock or vibration to a hard disk drive while one or more of its read/write heads are in operation. Some of the sources of severe shock or vibration can include dropping the hard disk drive onto a rigid surface, a hard external object or material colliding into the hard disk drive, and the like. Note that these sources of severe shock or vibration can accidentally occur to the hard disk drive even though care may be taken to handle and operate it.

One conventional technique used to protect a hard disk drive from head crash is to include a drop sensor within it. The idea behind this technique is that if the hard disk drive falls, the drop sensor is to detect the fall and then command the hard disk drive controller to suspend any current read/write operation and park the head safely away from the surface of the disk to prevent possible head disk contact. However, there are disadvantages associated with this technique. For example, in the event of an external object hitting the hard disk drive, the drop sensor technique is unable to detect the incoming object that will cause the severe shock or vibration. Another disadvantage is that the sensor technique only functions properly when the hard disk drive falls from a minimum height or higher. Otherwise the sensor technique is ineffective since it takes too long to complete its operation.

SUMMARY

One embodiment in accordance with the invention is an apparatus comprising a movement guide that can be utilized with a data storage device. The movement guide can be for preventing a magnetic head of the data storage device from contacting a disk of the data storage device during operation.

DETAILED DESCRIPTION

Reference will now be made in detail to various embodiments in accordance with the invention, examples of which are illustrated in the accompanying drawings. While the invention will be described in conjunction with various embodiments, it will be understood that these various embodiments are not intended to limit the invention. On the contrary, the invention is intended to cover alternatives, modifications and equivalents, which may be included within the scope of the invention as construed according to the Claims.

Furthermore, in the following detailed description of various embodiments in accordance with the invention, numerous specific details are set forth in order to provide a thorough understanding of the invention. However, it will be recognized by one of ordinary skill in the art that the invention may be practiced without these specific details. In other instances, well known methods, procedures, components, and circuits have not been described in detail as not to unnecessarily obscure aspects of the invention.

Figure 1:
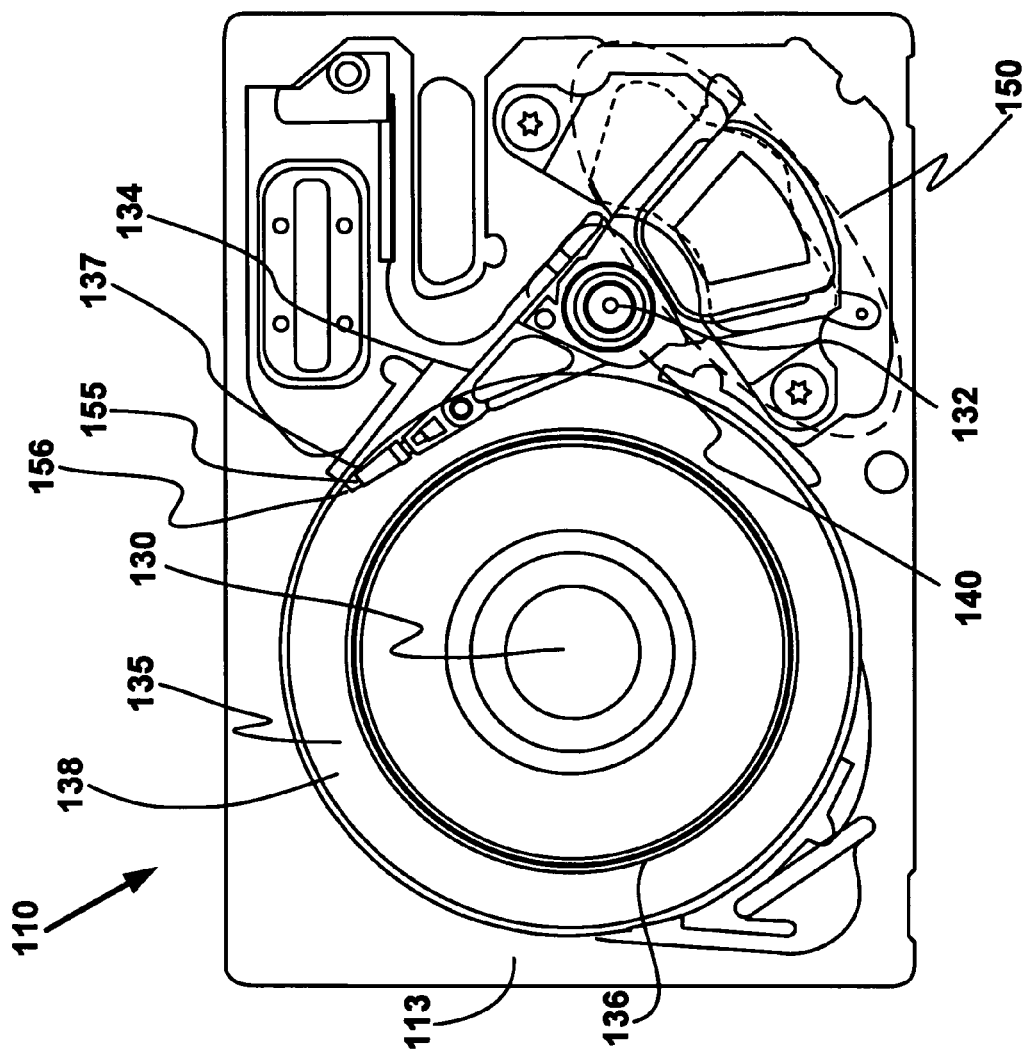
FIG. 1 is a plan view of an exemplary HDD with cover and top magnet removed in accordance with one embodiment of the present invention.

With reference now to FIG. 1, a plan view of an exemplary hard disk drive (HDD) 110 with cover and top magnet removed is shown in accordance with one embodiment of the invention. FIG. 1 illustrates the relationship of components and sub-assemblies of HDD 110 and a representation of data tracks 136 recorded on the disk surfaces 135 (one shown) of disk 138. The cover is removed and not shown so that the inside of HDD 110 is visible. The components are assembled into base casting 113, which provides attachment and registration points for components and sub-assemblies. The HDD 110 can be referred to as a data storage device.

A plurality of suspension assemblies 137 (one shown) are attached to the actuator arms 134 (one shown) in the form of a comb. A plurality of transducer heads or sliders 155 (one shown) are attached respectively to the suspension assemblies 137. Sliders 155 are located proximate to the disk surfaces 135 for reading and writing data with magnetic heads 156 (one shown). Note that the sliders 155 can include Head Gimbal Assemblies (HGAs), not shown, that are associated with the magnetic heads 156. The rotary voice coil motor 150 rotates actuator arms 134 about the actuator shaft 132 in order to move the suspension assemblies 137 to the desired radial position on disks 138. The actuator shaft 132, hub 140, actuator arms 134, and voice coil motor 150 may be referred to collectively as a rotary actuator assembly.

Data is recorded onto disk surfaces 135 of disk 138 in a pattern of concentric rings known as data tracks 136. Disk surface 135 is spun at high speed by means of a motor-hub assembly 130. Data tracks 136 are recorded onto spinning disk surfaces 135 by means of magnetic heads 156, which typically reside at the end of sliders 155. FIG. 1 being a plan view shows only one head, slider, and disk surface combination. One skilled in the art understands that what is described for one head-disk combination applies to multiple head-disk combinations, such as disk stacks (not shown). However, for purposes of brevity and clarity, FIG. 1 only shows one head and one disk surface.

Figure 2:
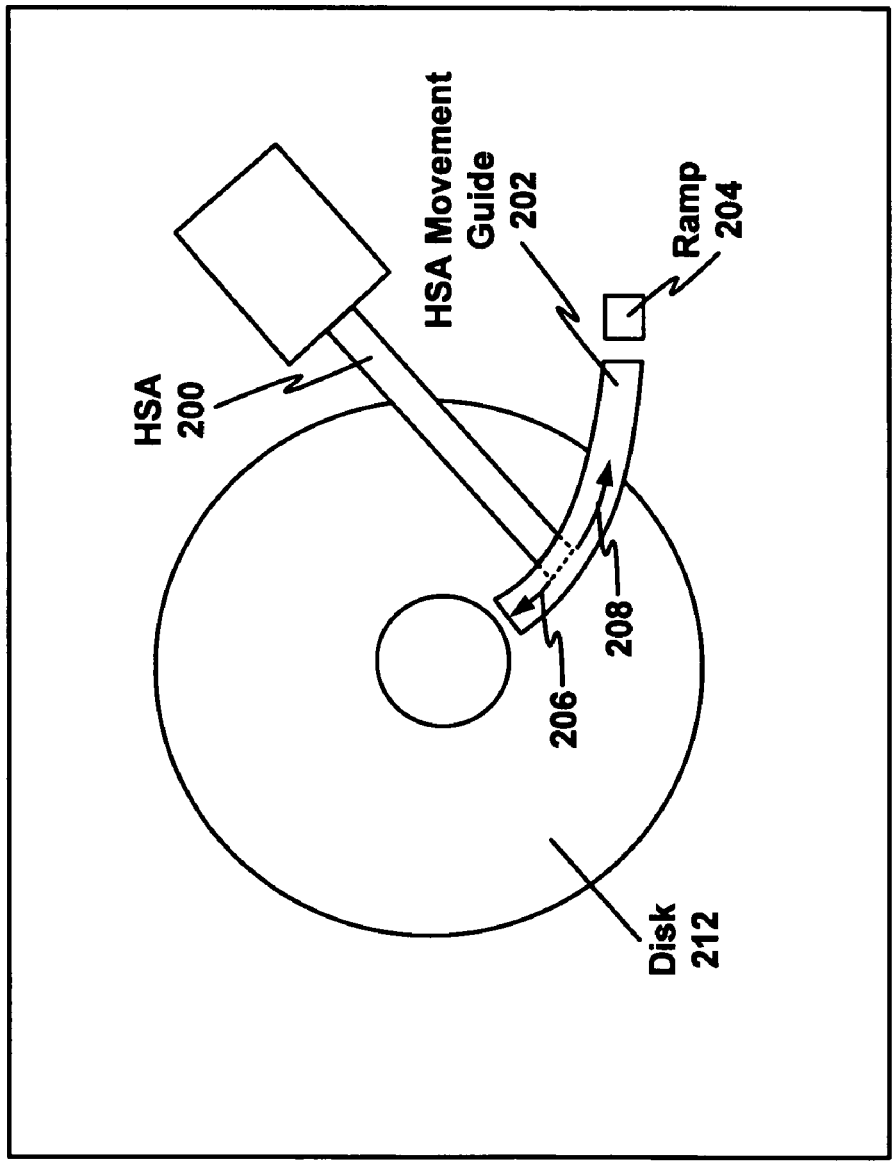
FIG. 2 is a plan view of an exemplary head stack assembly (HSA) movement guide in accordance with an embodiment of the invention.
Figure 3:
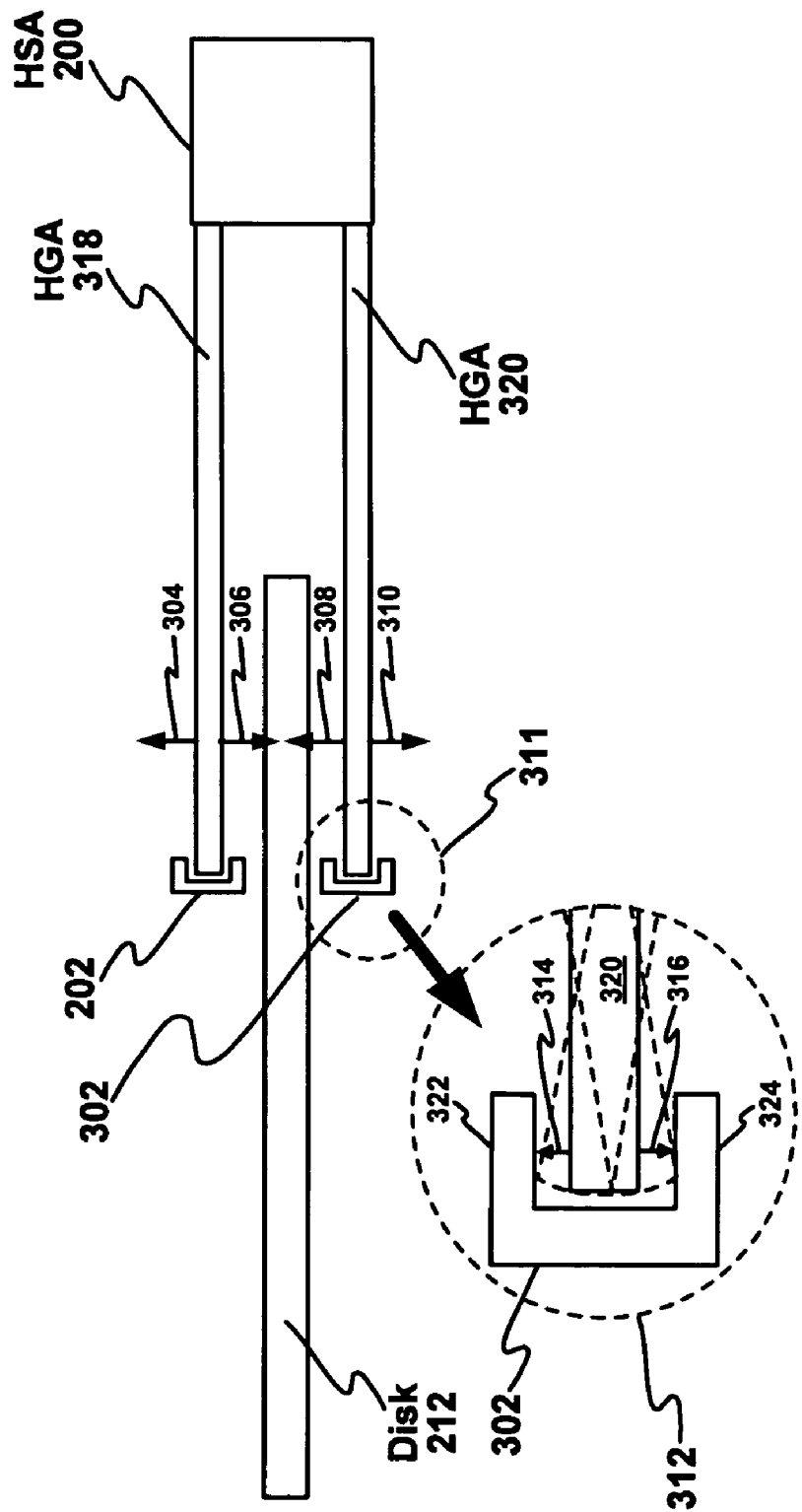
FIG. 3 is a side view of an exemplary HSA along with exemplary HSA movement guides in accordance with various embodiments of the invention.

FIG. 2 is a plan or top view of an exemplary head stack assembly (HSA) movement guide 202 in accordance with an embodiment of the invention while FIG. 3 is a side view of it. Specifically, FIG. 2 is a plan view of an exemplary hard disk drive (HDD) 210 that can include the exemplary HSA movement guide 202 in accordance with an embodiment of the invention. It is understood that HDD 210 can be implemented in a manner similar to HDD 110 of FIG. 1, but is not limited to such. The HDD 210 can include a Head Stack Assembly (HSA) 200 that can include, but is not limited to, the rotary voice coil motor 150, actuator arms 134, actuator shaft 132, suspension assemblies 137, hub 140, sliders 155, and magnetic heads 156 as shown in HDD 110 of FIG. 1. Note that the HSA movement guide 202 can provide support to a read/write head (e.g., 156) of the HSA 200 while the head is flying over a disk 212 during, for example, a read and/or write operation. As such, the HSA movement guide 202 can prevent (or restrict or limit) the magnetic heads 156 of the HSA 200 from contacting the disk 212. Therefore, head to disk contact and head crash can be prevented when HDD 210 experiences a severe shock caused by, for example, it falling and striking a rigid surface or by some external rigid object striking it. It is pointed out that the head stack assembly 200 can stay on a ramp 204 when no operation is being performed.

In various embodiments in accordance with the invention, the movement guide 202 can provide support primarily at or near the tip of the head gimbal assembly (HGA) of the HSA 200 in order to enhance stability of it. Note that with the HSA movement guide 202 to support the end or tip of the HSA 200 and the other end of the HSA 200 firmly attached to the hard disk enclosure (e.g., casting 113), the HSA 200 can be secured during its operational mode, which can include read and write operations. For example, when a controller (not shown) of the HDD 210 issues a command, a head (e.g., 156) of the HSA 200 unloads from the ramp 204 and a tip or portion of the HSA 200 enters into the HSA movement guide 202. As such, when the head of the HSA 200 moves in a sideways or horizontal direction (as indicated by arrows 206 and 208) over the disk 212, the head can be supported and/or guided by the HSA movement guide 202, which can maintain that head at a desirable flying height above the disk 212. As such, the HSA movement guide 202 can restrict a substantial change in the flying height of the head of the HSA 200 above the disk 212. Therefore, the HSA movement guide 202 can provide support for the HSA 200 while it is above disk 212, such as during read/write operations above the disk 212. It is noted that the HSA movement guide 202 is constantly present to protect the HSA 200 from head on disk contact in the event of a severe shock or vibration encountered by the HDD 210.

Within FIG. 2, the HSA movement guide 202 can be fabricated from (or implemented with) one or more materials. For example, the HSA movement guide 202 can be fabricated from or implemented with a contaminant-free material such as, but not limited to, a plastic, a plastic resin (e.g., Polyacetal), and the like. Furthermore, the HSA movement guide 202 can be fabricated from or implemented with a scratch-free material.

FIG. 3 is a side view of HSA 200 and exemplary HSA movement guides 202 and 302 in accordance with various embodiments of the invention. Note that the HSA 200 can include HGAs 318 and 320, wherein the HGA 318 is located above disk 212 while HGA 320 is located beneath disk 212. Additionally, the HSA movement guide 202 (corresponding to the HGA 318) is located above disk 212 while the HSA movement guide 302 (corresponding to the HGA 320) is located beneath disk 212. As data is read from or written to the disk 212 by one or more heads of the HSA 200, each tip of the HGAs 318 and 320 can continuously slide or move within the HSA movement guides 202 and 302, respectively. Indeed, each of the HSA movement guides 202 and 302 can guide the sideways movement of HGAs 318 and 320, respectively. Furthermore, the shape and location of each of HSA movement guides 202 and 302 can restrict the vertical movement of HGAs 318 and 320, respectively.

For example, if the HDD 210 experiences a severe shock or vibration while in operational mode, there is a tendency for HGA 318 to move up and down vertically (as indicated by arrows 304 and 306) and for HGA 320 to move up and down vertically (as indicated by arrows 308 and 310). As such, if the movement guides 202 and 302 were not present, HGA 318 and/or HGA 320 could have moved toward the surface of the disk 212 and could have caused disk scratch and worse, head crash. However, the HSA movement guides 202 and 302 can each restrict or limit the vertical movement of the HGAs 318 and 320, respectively, which can prevent or prohibit each of the HGAs 318 and 320 (or any of their heads, not shown) from making contact with the disk 212. In this manner, each of the HSA movement guides 202 and 302 can function as a safety guard to ensure a proper distance or flying height between the read/write heads of the HGAs 318 and 320, respectively, and the disk 212. As such, each of the HSA movement guides 202 and 302 can restrict or limit a substantial change in a flying-height between the magnetic read/write heads of the HGAs 318 and 320, respectively, and the disk 212.

Within FIG. 3, a dashed circle 312 includes an enlarged or closer view of the HSA movement guide 302 and HGA 320 that are included within a dashed circle 311. Specifically, in various embodiments, the HSA movement guide 302 can be implemented to include, but is not limited to, a first protrusion (or flange) 322 and a second protrusion (or flange) 324. The protrusions 322 and 324 of the HSA movement guide 302 can form a groove wherein the tip of the HGA 320 can travel. As such, the first protrusion 322 can limit or restrict the vertical upward movement or motion (as indicated by arrow 314) of the HGA 320 while the second protrusion 324 can limit or restrict the vertical downward movement or motion (as indicated by arrow 316) of the HGA 320. In this manner, vertical movement and/or vibration of the HGA 320 can be restricted or limited, which can ensure a proper distance or flying height between the read/write heads of the HGA 320 and the disk 212. As such, the protrusions 322 and 324 of the HSA movement guide 302 can restrict or limit a substantial change in a flying-height between the magnetic read/write heads of the HGA 320 and the disk 212.

Note that each of the protrusions 322 and 324 can be implemented with a similar thickness (as shown) or with a different thickness (not shown). Moreover, each of the protrusions 322 and 324 can be implemented to be thicker or thinner than shown in FIG. 3. The protrusions 322 and 324 can be implemented to have similar lengths, differing lengths, similar widths, and differing widths, but is not limited to such. Note that in one embodiment, the HSA movement guide 302 can be implemented to include just protrusion 322, which is the protrusion of the movement guide 302 that is located closer to disk 212. In this manner, the one or more heads of the HGA 320 are restricted from contacting disk 212. It is pointed out that the HSA movement guide 202 can also be implemented in any manner similar to the HSA movement guide 302, but is not limited to such.

In various embodiments in accordance with the invention, the HSA movement guides 202 and 302 can be implemented with or fabricated from any material that can withstand the friction generated by continuous contact of the tip of the HGAs 318 and 320, respectively. Furthermore in accordance with various embodiments, any material can be utilized that is sturdy and scratch-free to avoid contaminants. Moreover in accordance with various embodiment, any material can be utilized that can provide smooth movement of the tip of the HGAs 318 and 320. For example, the material that each of the HSA movement guides 202 and 302 can each be implemented with or fabricated from can include, but is not limited to, a plastic, a plastic resin (e.g., Polyacetal), and the like.

Figure 4:
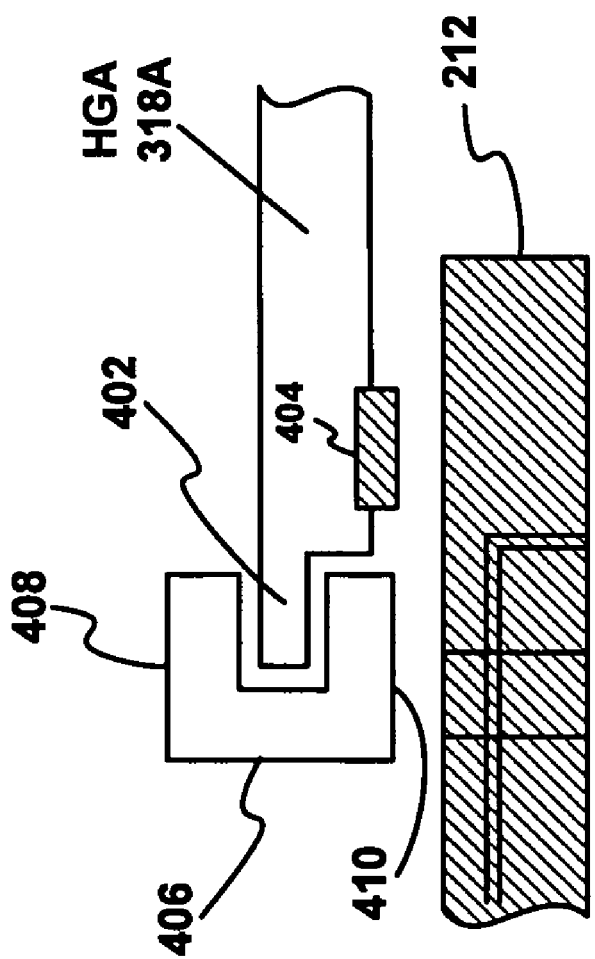
FIG. 4 is a side sectional view of an exemplary HSA movement guide and an exemplary HGA in accordance with various embodiments of the invention.

FIG. 4 is a side sectional view of an exemplary HSA movement guide 406 and an exemplary HGA 318A in accordance with various embodiments of the invention. Specifically, the HGA 318A can include a protrusion (or lift tab) 402 that can be located between a first protrusion (or flange) 408 and a second protrusion (or flange) 410 of HSA movement guide 406 during read/write operations of magnetic head 404. The protrusions 408 and 410 of the HSA movement guide 406 can form a groove wherein the lift tab 402 of the HGA 318A can travel. Note that the HSA movement guide 406 can function and be implemented in any manner similar to any HSA movement guide described herein, but is not limited to such. It is pointed out that by implementing the HGA 318A to include the lift tab 402, the read/write head 404 of the HGA 318A can be located closer to the disk 212 thereby resulting in a lower or smaller flying height above the disk 212. Additionally, the protrusions 408 and 410 of the HSA movement guide 406 can restrict or limit the vertical movement or motion of the lift tab 402 of the HGA movement guide 318A, thereby preventing the head 404 of the HGA 318A from contacting disk 212. It is noted that protrusions 408 and 410 of the HSA movement guide 406 can function in any manner similar to protrusions 322 and 324 of HSA movement guide 302 described herein, but is not limited to such.

In accordance with various embodiments, the protrusions 408 and 410 of HSA movement guide 406 can be implemented in a wide variety of ways. For example in various embodiments, the protrusions 408 and 410 can be implemented with a similar thickness (as shown) or with a different thickness (not shown). Moreover, each of the protrusions 408 and 410 can be implemented to be thicker or thinner than shown in FIG. 4. The protrusions 408 and 410 can be implemented to have similar lengths, differing lengths, similar widths, and differing widths, but is not limited to such. The magnetic head 404 can be coupled to HGA 318A, but is not limited to such.

Figure 5:
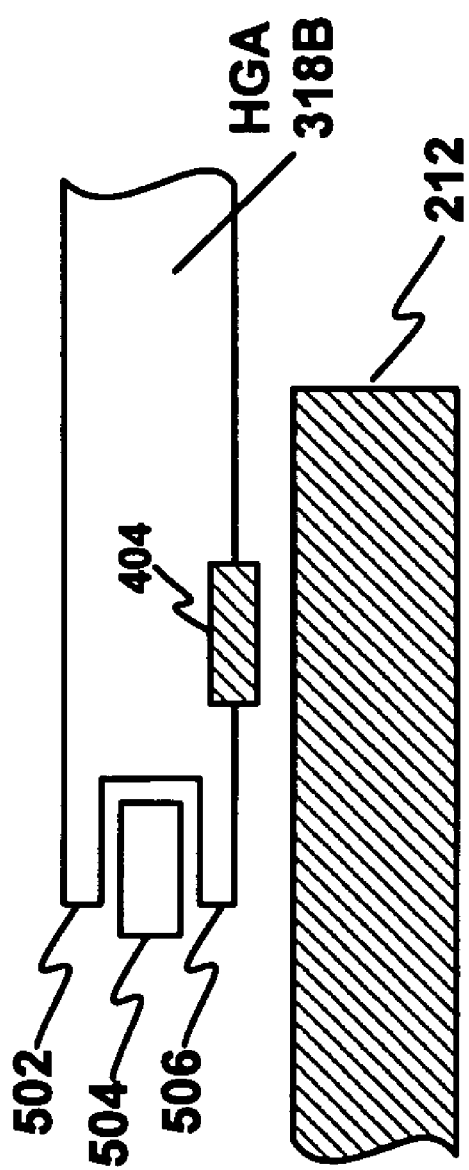
FIG. 5 is a side sectional view of another exemplary HSA movement guide and an exemplary HGA in accordance with various embodiments of the invention.

FIG. 5 is a side sectional view of an exemplary HSA movement guide 504 and an exemplary HGA 318B in accordance with various embodiments of the invention. Specifically, in various embodiments, the HGA 318B can be implemented to include, but is not limited to, a first protrusion (or flange) 502 and a second protrusion (or flange) 506. Furthermore, the HSA movement guide 504 can be located between the first protrusion 502 and second protrusion 506 of the HGA 318B during read/write operations of head 404. The protrusions 502 and 506 of the HGA 318B can form a groove that can travel along the HSA movement guide 504. As such, the HSA movement guide 504 can limit or restrict the vertical upward movement or motion of the first protrusion 506 of the HGA 318B while the HSA movement guide 504 can limit or restrict the vertical downward movement or motion of the second protrusion 502 of the HGA 318B. In this manner, vertical movement and/or vibration of the HGA 318B can be restricted or limited, which can ensure a proper distance or flying height between its read/write head 404 and the disk 212. Note that the HSA movement guide 504 can function and be implemented in any manner similar to any HSA movement guide described herein, but is not limited to such. It is pointed out that by implementing the HSA movement guide 504 and HGA 318B in a manner similar to that shown in FIG. 5, the read/write head 404 of the HGA 318B can be located closer to the disk 212 thereby resulting in a lower or smaller flying height above the disk 212. Additionally, since the HSA movement guide 504 and the protrusions 502 and 506 of the HGA 318B can have a small form factor, they can be utilized in HDDs that have limited space. Note that in one embodiment, the HGA 318B can be implemented to include just protrusion 502, which is the protrusion of the HGA 318B that is located further from disk 212. In this manner, the one or more heads 404 of the HGA 318B are restricted from contacting disk 212.

In accordance with various embodiments, the protrusions 502 and 506 of the HGA 318B can be implemented in a wide variety of ways. For example in various embodiments, each of the protrusions 502 and 506 of HGA 318B can be implemented with a similar thickness (as shown) or with a different thickness (not shown). Moreover, each of the protrusions 502 and 506 can be implemented to be thicker or thinner than shown in FIG. 5. The protrusions 502 and 506 can be implemented to have similar lengths, differing lengths, similar widths, and differing widths, but is not limited to such. The HSA movement guide 504 can be implemented to be larger and smaller than shown in FIG. 5. Additionally, the cross section of the HSA movement guide 504 can be any shape, such as but not limited to, a rectangle, a square, a circle, an oval, a triangle, a polygon, and the like. The magnetic head 404 can be coupled to HGA 318B, but is not limited to such.

Figure 6:
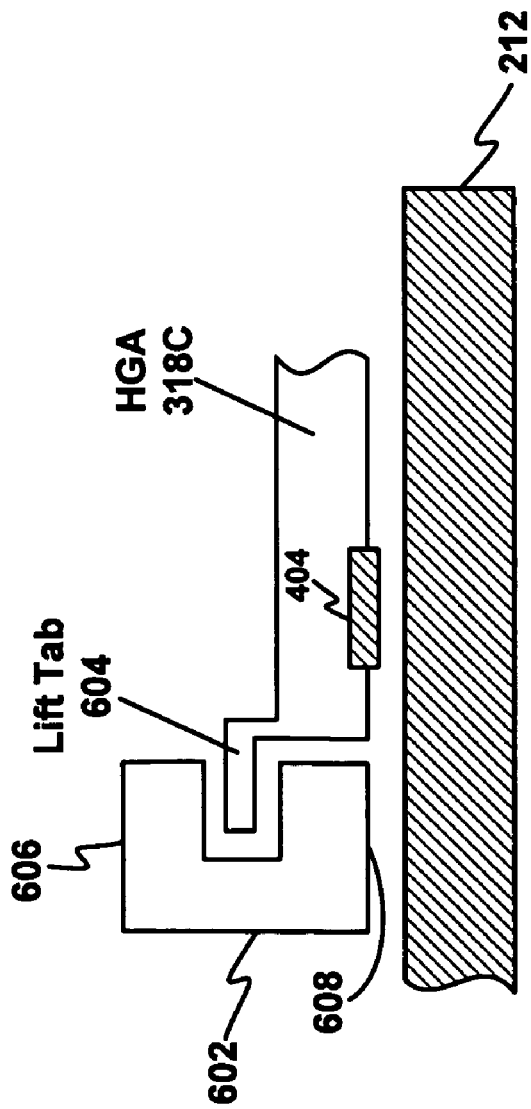
FIG. 6 is a side sectional view of yet another exemplary HSA movement guide and an exemplary HGA in accordance with various embodiments of the invention.

FIG. 6 is a side sectional view of an exemplary HSA movement guide 602 and an exemplary HGA 318C in accordance with various embodiments of the invention. Specifically, the HGA 318C can include an elevated protrusion (or lift tab) 604 that can be located between a first protrusion (or flange) 606 and a second protrusion (or flange) 608 of the HSA movement guide 602 during read/write operations of head 404. The protrusions 606 and 608 of the HSA movement guide 602 can form a groove wherein the extended lift tab 604 of the HGA 318C can travel. Note that the HSA movement guide 602 can function and be implemented in any manner similar to any HSA movement guide described herein, but is not limited to such. It is pointed out that by implementing the HGA 318C to include the elevated lift tab 604, the read/write head 404 of the HGA 318C can be closely located to the disk 212 thereby resulting in a lower or smaller flying height above the disk 212. Moreover, by implementing the HGA 318C to include the elevated lift tab 604, the HSA movement guide 602 can be included within a HDD (e.g., 210) even when there is a small gap between the head 404 and the disk 212. Note that the protrusions 606 and 608 of the HSA movement guide 602 can restrict or limit the vertical movement or motion of the elevated lift tab 604 of the HGA movement guide 318C, thereby preventing the head 404 of the HGA 318C from contacting disk 212. It is pointed out that protrusions 606 and 608 of the HSA movement guide 602 can function in any manner similar to any protrusions of any HSA movement guide described herein, but are not limited to such.

In accordance with various embodiments, the protrusions 606 and 608 of HSA movement guide 602 can be implemented in a wide variety of ways. For example in various embodiments, the protrusions 606 and 608 can be implemented with a similar thickness (as shown) or with a different thickness (not shown). Moreover, each of the protrusions 606 and 608 can be implemented to be thicker or thinner than shown in FIG. 6. The protrusions 606 and 608 can be implemented to have similar lengths, differing lengths, similar widths, and differing widths, but is not limited to such. The magnetic head 404 can be coupled to HGA 318C, but is not limited to such.

Figure 7:
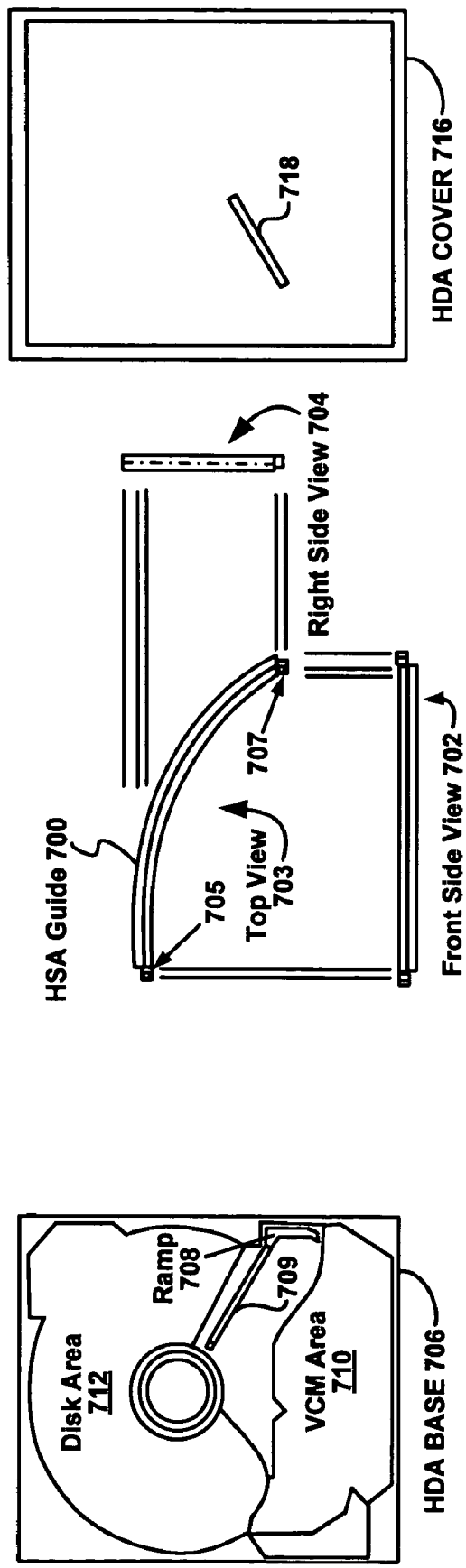
FIG. 7 illustrates still another exemplary HSA movement guide along with exemplary installation locations in accordance with various embodiments of the invention.

FIG. 7 illustrates an exemplary HSA movement guide 700 along with exemplary installation locations in accordance with various embodiments of the invention. Specifically, FIG. 7 includes a top view 703, a front side view 702, and a right side view 704 of the HSA movement guide 700 in accordance with various embodiments. It is pointed out that HSA movement guide 700 can be implemented in a manner similar to any HSA movement guide described herein, but is not limited to such. In one embodiment, the HSA movement guide 700 can be implemented to include mounting or fastening cavities 705 and 707 wherein each is for receiving a mounting means or a fastener, such as, a screw, a rivet, and the like, but is not limited to such.

In an embodiment of the invention, each head gimbal assembly (e.g., 318 and 320) of a HDD (e.g., 210) can have its own HSA movement guide similar to the HSA movement guide 700. For example in one embodiment, a HSA movement guide 709 can be mounted to or fastened to or incorporated with or installed within a Head Disk Assembly (HDA) base 706 (also known as a HDD base) for supporting or guiding a lower head gimbal assembly (e.g., 320). Additionally, a HSA movement guide 718 can be mounted to or fastened to or incorporated with or installed within a HDA cover 716 (also known as a HDD cover) for supporting or guiding an upper head gimbal assembly (e.g., 318). It is pointed out that each of the HSA movement guides 709 and 718 can be implemented similar to HSA movement guide 700. As such, the HSA movement guides 709 and 718 can each include mounting or fastening cavities (e.g., 705 and 707), not shown, for each receiving a mounting means or a fastener, as described herein. By mounting or fastening the HSA movement guides 709 and 718 in this manner, they are can be fixed and stable.

Note that FIG. 7 shows the HSA movement guides 709 and 718 as having a straight shape, but the HSA movement guides 709 and 718 can each be implemented with a curve similar to the shape of the HSA movement guide 700, but is not limited to such. It is pointed out that each of the HSA movement guides 700, 709 and 718 can function and be implemented in any manner similar to any HSA movement guide described herein, but is not limited to such.

Figure 8:
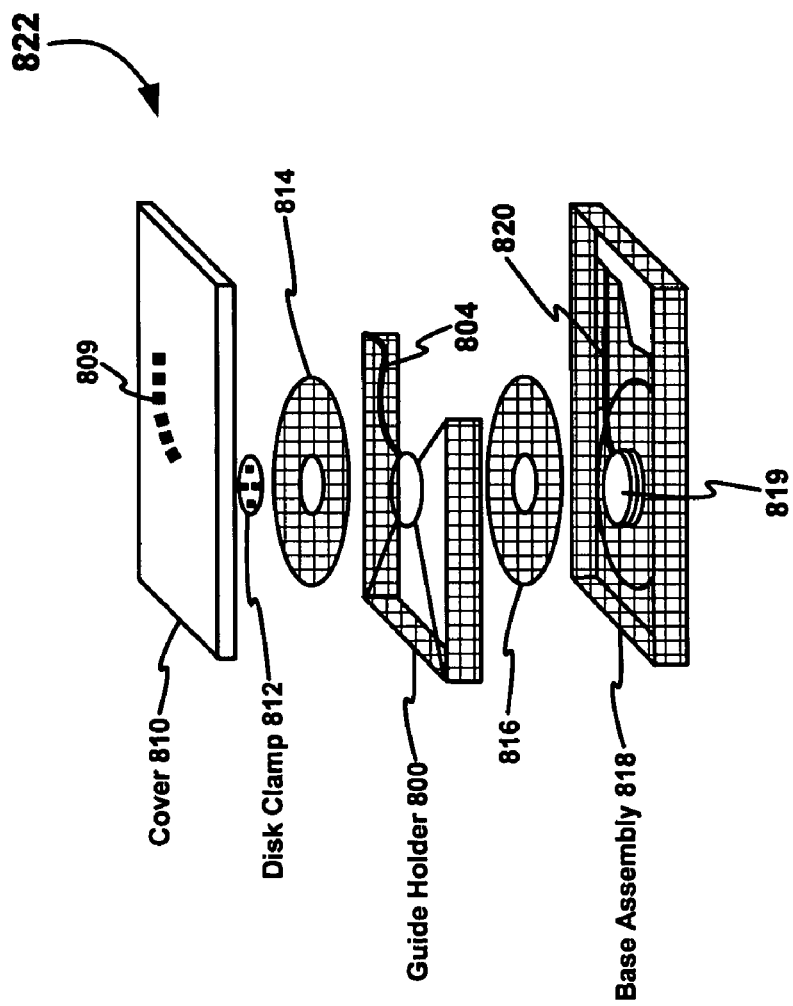
FIG. 8 illustrates an exemplary HSA guide holder that includes an exemplary HSA movement guide in accordance with various embodiments of the invention.
Figure 8:
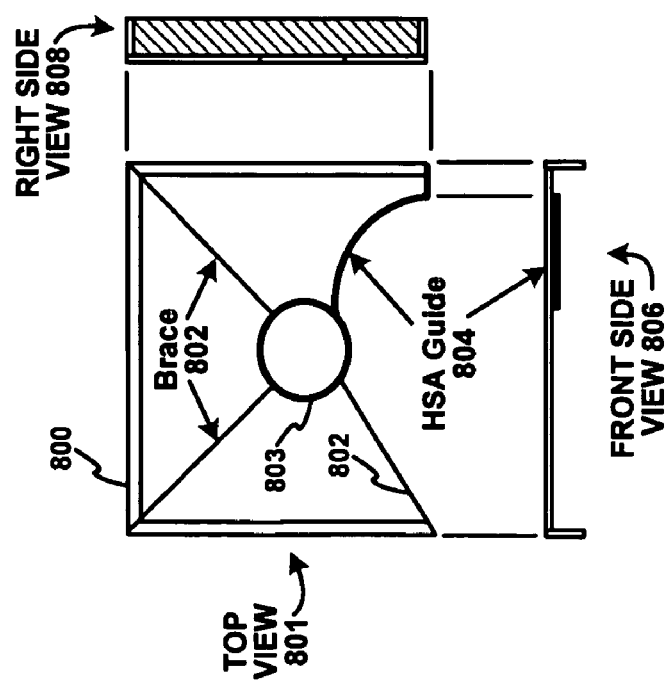

FIG. 8 illustrates an exemplary HSA guide holder 800 that includes an exemplary HSA movement guide 804 in accordance with various embodiments of the invention. Specifically, the HSA guide holder 800 illustrates one embodiment in accordance with the invention for implementing or incorporating the HSA movement guide 804 within an exemplary HDD 822 that includes multiple disks (e.g., 814 and 816). FIG. 8 includes a top view 801, a front side view 806, and a right side view 808 of the HSA guide holder 800, which includes the HSA movement guide 804. Additionally, FIG. 8 includes an expanded or "exploded" view of the HDD 822 that includes disks 814 and 816 along with the HSA guide holder 800. It is pointed out that the HSA movement guide 804 can be implemented in any manner similar to any HSA movement guide described herein, but is not limited to such.

The HSA guide holder or bracket 800 can include multiple support braces 802 that are connected to a circular brace 803 that together provide a stable framework for the HSA movement guide 804. The circular brace 803 can be located at or near the center to give way for a motor-hub assembly (or spindle) 819 of the HDD 822. It is pointed out that in one embodiment the HSA movement guide 804 can be fabricated as part of the HSA guide holder 800. However, the HSA movement guide 804 can be fabricated separately from the HSA guide holder 800 and then they can be combined (or attached or connected) together. Moreover, the HSA guide holder 800 along with the HSA movement guide 804 can be fabricated from or implemented with the same or different materials. It is noted that the HSA guide holder 800 and the HSA movement guide 804 can be can be fabricated from or implemented with any material described herein, but are not limited to such.

Within FIG. 8, the HDD 822 can include a base assembly 818 wherein a first HSA movement guide 820 (in accordance with an embodiment of the invention) has been attached or connected thereto. The HDD 822 can also include a first disk 816 and the HSA guide holder 800, which includes the HSA movement guide 804. The disk 816 can be located beneath the HSA guide holder 800. The HDD 822 can include a second disk 814 that can be located above the HSA guide holder 800. The HDD 822 can also include a disk clamp 812 for securing disks 814 and 816 along with the HSA guide holder 800 to the base assembly 818. The HDD 822 can include a cover 810 wherein a third HSA movement guide 809 (in accordance with an embodiment of the invention) has been attached or connected thereto (shown as a dotted curved line). When the HDD 822 is assembled in this manner, the HSA guide holder 800 can provide a substantially fixed support for the HSA movement guide 804.

Note that in one embodiment, the HSA movement guide 804 can be implemented such that it can receive two HGAs (e.g., 318 and 320) at substantially the same time. For example, the HSA movement guide 804 could include three protrusions (e.g., similar to protrusions 322 and 324) that would form two substantially parallel grooves in which two HGAs can slide within at substantially the same time.

Figure 9:
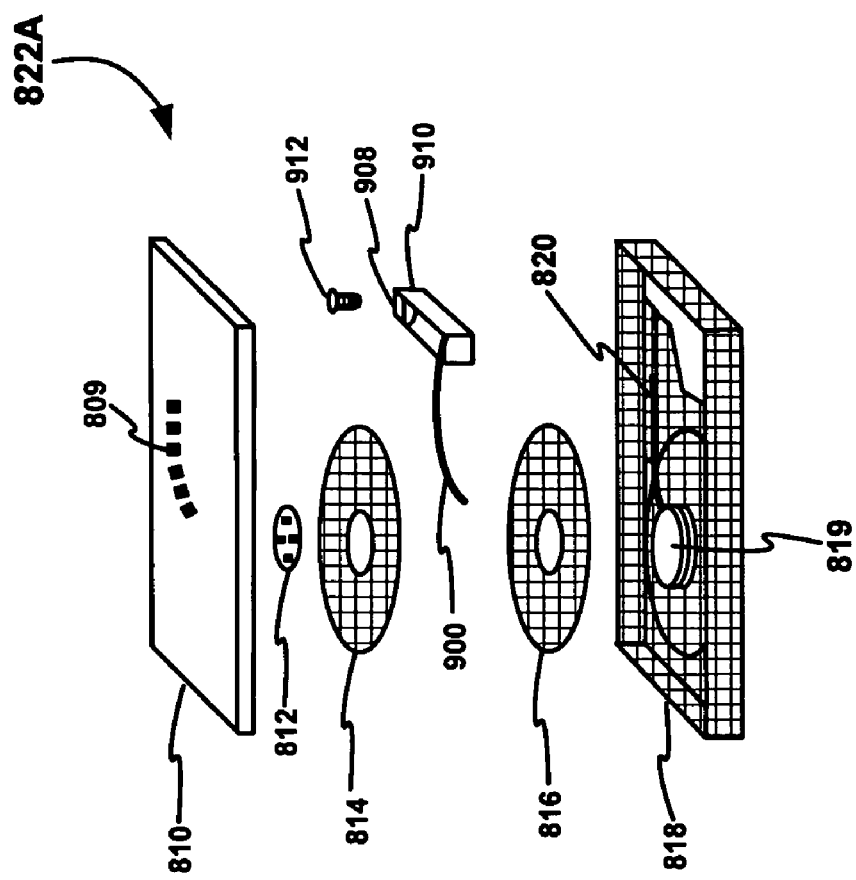
FIG. 9 illustrates another exemplary HSA movement guide in accordance with various embodiments of the invention.
Figure 9:
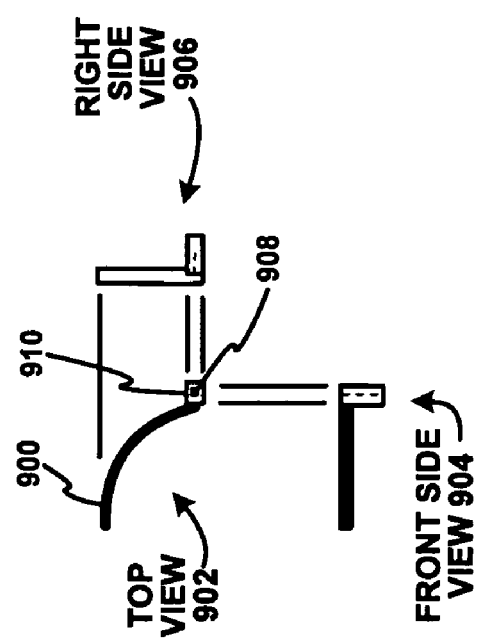

FIG. 9 illustrates an exemplary HSA movement guide 900 in accordance with various embodiments of the invention. Specifically, FIG. 9 illustrates one embodiment in accordance with the invention for implementing the HSA movement guide 900 within an exemplary HDD 822A that includes multiple disks (e.g., 814 and 816). FIG. 9 includes a top view 902, a front side view 904, and a right side view 906 of the HSA movement guide 900. Additionally, FIG. 9 include an expanded or "exploded" view of the HDD 822A that includes disks 814 and 816 along with the HSA movement guide 900. It is pointed out that the HSA movement guide 900 can be implemented in any manner similar to any HSA movement guide described herein, but is not limited to such.

The HSA movement guide 900 can include a mounting end 910 that can include one or more fastener cavities 908, each for receiving a mounting means or a fastener. Note that the fastener cavity 908 of FIG. 9 extends through the mounting end 910. The mounting end 910 of the HSA movement guide 900 can be utilized for attaching or coupling the HSA movement guide 900 to a base assembly (e.g., 818) of a HDD (e.g., 822A). In various embodiments, the end of the HSA movement guide 900 that is opposite the mounting end 910 may or may not be attached to the spindle 819 when the HSA movement guide 900 is installed or incorporated within the HDD 822A. It is pointed out that in one embodiment the mounting end 910 can be fabricated as part of the HSA movement guide 900. However, the HSA movement guide 900 can be fabricated separately from the mounting end 910 and then they can be combined (or attached or connected) together. Moreover, the HSA movement guide 900 along with the mounting end 910 can be fabricated from or implemented with the same or different materials. It is noted that the HSA movement guide 900 and the mounting end 910 can be fabricated from or implemented with any material described herein, but are not limited to such.

Within FIG. 9, the HDD 822A can include the base assembly 818 wherein the first HSA movement guide 820 has been attached or connected thereto. The HDD 822A can also include the first disk 816 and the HSA movement guide 900, which includes the mounting end 910. The disk 816 can be located beneath the HSA movement guide 900. The HDD 822A can include the second disk 814 that can be located above the HSA movement guide 900. The HDD 822A can also include the disk clamp 812 for securing disks 814 and 816 to the base assembly 818. The HDD 822A can also include a fastener 912 (e.g., a screw, a rivet, and the like) for mounting or attaching the mounting end 910 of the HSA movement guide 900 to the base assembly 818. It is noted that the fastener 912 can be utilized in combination with the fastener cavity 908 of the mounting end 910 of the HSA movement guide 900. The HDD 822A can include the cover 810 wherein the third HSA movement guide 809 has been attached or connected thereto (shown as a dotted curved line). In this manner, the HSA movement guide 900 can be incorporated with or installed within the HDD 822A, but is not limited to such.

Note that in one embodiment, the HSA movement guide 900 can be implemented such that it can receive two HGAs (e.g., 318 and 320) at substantially the same time. For example, the HSA movement guide 900 could include three protrusions (e.g., similar to protrusions 322 and 324) that would form two substantially parallel grooves in which two HGAs can slide within at substantially the same time.

Figure 10:
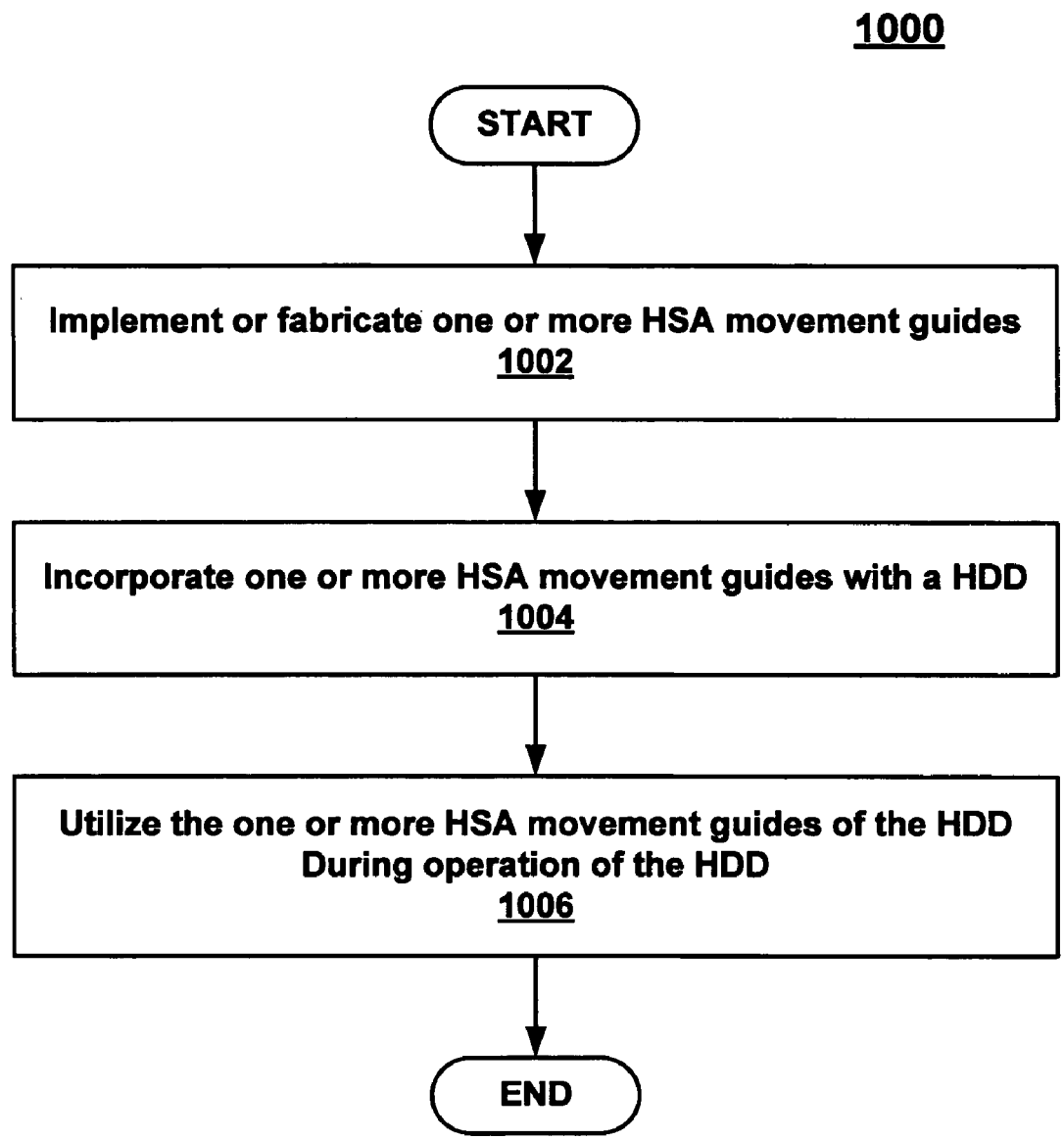
FIG. 10 is a flow diagram of an exemplary method in accordance with various embodiments of the invention.

FIG. 10 is a flow diagram of an exemplary method 1000 in accordance with various embodiments of the invention for incorporating and using one or more HSA movement guides. Although specific operations are disclosed in method 1000, such operations are exemplary. Method 1000 may not include all of the operations illustrated by FIG. 10. Also, method 1000 may include various other operations and/or variations of the operations shown by FIG. 10. Likewise, the sequence of the operations of method 1000 can be modified. It is noted that the operations of method 1000 can be performed manually, by software, by firmware, by electronic hardware, or by any combination thereof.

Specifically, method 100 can include implementing or fabricating one or more HSA movement guides. One or more HSA movement guides can be incorporated or implemented with a HDD. The one or more HSA movement guides of the HDD can be utilized during operation of the HDD.

At operation 1002 of FIG. 10, one or more HSA movement guides can be implemented or fabricated. It is pointed out that operation 1002 can be implemented in a wide variety of ways. For example in various embodiments, one or more HSA movement guides can be implemented or fabricated at operation 1002 in any manner similar to that described herein, but is not limited to such.

At operation 1004, one or more HSA movement guides can be incorporated or implemented with a HDD (e.g., 210). It is noted that operation 1004 can be implemented in a wide variety of ways. For example in various embodiments, one or more HSA movement guides can be incorporated or implemented with a HDD at operation 1004 in any manner similar to that described herein, but is not limited to such.

At operation 1006 of FIG. 10, the one or more HSA movement guides of the HDD can be utilized during operation of the HDD. Note that operation 1006 can be implemented in a wide variety of ways. For example in various embodiments, the one or more HSA movement guides of the HDD can be utilized during operation of the HDD at operation 1006 in any manner similar to that described herein, but is not limited to such. At the completion of operation 1006, process 1000 can be exited.

It is pointed out that any HSA movement guide mentioned herein may also be referred to as, but is not limited to, a movement guide, a movement support, a movement limiter, a movement restrictor, a movement restraint, a support, a limiter, a restrictor, a guide, and a restraint.

The foregoing descriptions of various specific embodiments in accordance with the invention have been presented for purposes of illustration and description. They are not intended to be exhaustive or to limit the invention to the precise forms disclosed, and obviously many modifications and variations are possible in light of the above teaching. The invention can be construed according to the Claims and their equivalents.

What is claimed is:

1. A data storage device comprising:
 a disk;
 a head gimbal assembly;
 a magnetic head coupled to said head gimbal assembly; and a movement guide, separate from said head gimbal assembly, for said head gimbal assembly, wherein said movement guide is configured to allow a portion of said head gimbal assembly to move within said movement guide during operations to read and/or write data to different data tracks on said disk wherein said movement guide prevents said magnetic head of said head gimbal assembly from contacting said disk during the operations of said data storage device.

2. The data storage device of claim 1, wherein said movement guide restricts a substantial change in a flying-height of said magnetic head.

3. The data storage device of claim 1, wherein said movement guide comprises a substantially contaminant-free material.

4. The data storage device of claim 3, wherein said substantially contaminant-free material comprises a plastic resin.

5. The data storage device of claim 4, wherein said plastic resin comprises Polyacetal.

6. The data storage device of claim 1, wherein said head gimbal assembly comprises a protrusion that extends away from said magnetic head and is configured to enter a groove of said movement guide, wherein said protrusion of said head gimbal assembly is limited to movement within said groove of said movement guide.

7. The data storage device of claim 1, further comprising:
 a base, wherein said movement guide is coupled to said base.

8. The data storage device of claim 1, further comprising:
 a cover, wherein said movement guide is coupled to said cover.

9. The data storage device of claim 1, wherein said movement guide is part of a bracket that supports said movement guide.

10. An apparatus comprising:
 a movement guide for utilizing with a data storage device, wherein said movement guide is configured to allow a portion of a head gimbal assembly of said storage device to move within said movement guide and prevent a magnetic head coupled to said head gimbal assembly from contacting a disk of said data storage device during operations to read and/or write data to different data tracks on said disk and wherein said movement guide is coupled to a cover of said data storage device.

11. The apparatus of claim 10, wherein said magnetic head is coupled to a head gimbal assembly.

12. The apparatus of claim 11, wherein said movement guide for functioning with said head gimbal assembly.

13. The apparatus of claim 10, wherein said movement guide for restricting a substantial change in a flying-height of said magnetic head.

14. The apparatus of claim 10, wherein said movement guide comprises a substantially contaminant-free material.

15. The apparatus of claim 14, wherein said substantially contaminant-free material comprises a plastic resin.

16. A method for assembling a data disk storage device having a magnetic head and a cover, comprising:
 coupling said magnetic head to a head gimbal assembly such that a portion of said head gimbal assembly protrudes away from said magnetic head;
 forming a movement guide;
 coupling said movement guide to said cover; and
 incorporating said movement guide in said data disk storage device such that said movement guide is separate from said head gimbal assembly and allows said portion of said head gimbal assembly that protrudes away from said magnetic head to move within said movement guide during operations to read and/or write data to different data tracks on said disk, said movement guide prevents said magnetic head from contacting said disk during the operations of said data disk storage device.

17. The method of claim 16, wherein said movement guide restricts a substantial change in a flying-height of said magnetic head.

18. The method of claim 16, wherein said forming said movement guide further comprises forming a groove in said movement guide such that said portion of said head gimble assembly that protrudes away from said magnetic head may enter said groove of said movement guide.

19. The method of claim 16, wherein said operation comprises a read operation by said magnetic head.

20. The method of claim 19, wherein said operation comprises a write operation by said magnetic head.

* * * * *